F. T. SNYDER.
APPARATUS FOR CHARGING ELECTRIC FURNACES AND THE LIKE.
APPLICATION FILED JUNE 22, 1917.
1,276,586.
Patented Aug. 20, 1918.
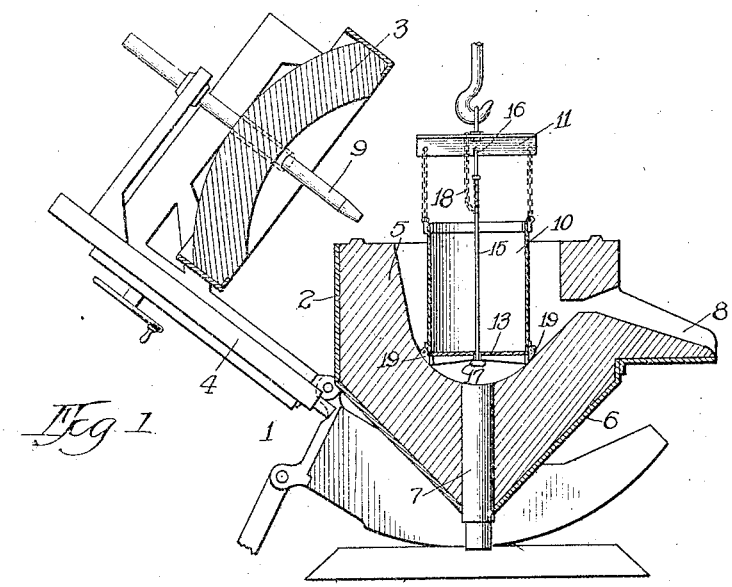
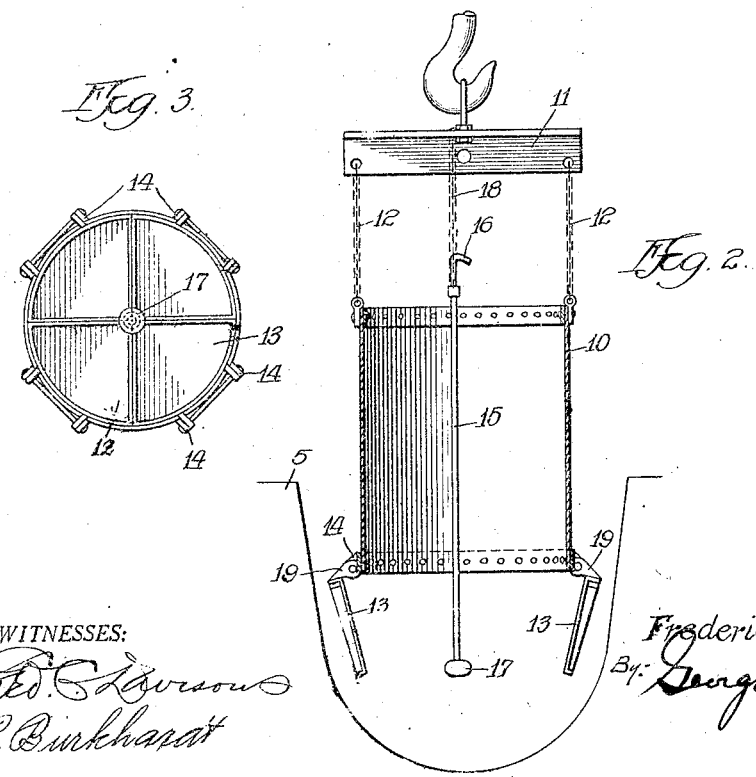

UNITED STATES PATENT OFFICE.

FREDERICK T. SNYDER, OF OAK PARK, ILLINOIS.

APPARATUS FOR CHARGING ELECTRIC FURNACES AND THE LIKE.

1,276,586.  Specification of Letters Patent.  Patented Aug. 20, 1918.

Application filed June 22, 1917. Serial No. 176,431.

*To all whom it may concern:*

Be it known that I, FREDERICK T. SNYDER, a citizen of the United States, residing at Oak Park, in the county of Cook and State of Illinois, have invented a certain new and useful Improvement in Apparatus for Charging Electric Furnaces and the like, of which the following is a full, clear, concise, and exact description.

This invention relates to new and improved apparatus for charging electric furnaces and the like.

Heretofore, it has been common to charge electric furnaces through charging ports, opening around the sides of the furnace and extending radially into the melting chamber thereof. This method is a very slow one, resulting in much heat loss in the furnace; in a deterioration of the electrode thereof, and also renders necessary the breaking up of the scrap into small pieces before it can be passed through the charging ports.

The present method overcomes these various disadvantages and consists in charging electric furnaces by introducing the scrap directly into the melting chamber through the top of the furnace, thereby effecting a great saving in time and accordingly increasing the output of the furnace.

The object of the present invention is to provide a new and improved form of charging bucket, for carrying out the above method of charging.

Other objects and advantages will be apparent from the following description, taken in connection with the accompanying drawings, wherein the preferred embodiment of the invention is illustrated.

Figure 1 is a cross sectional view of an electric furnace showing the charging bucket lowered into the melting chamber thereof, prior to discharging the scrap.

Fig. 2 is a sectional view illustrating the manner in which the scrap is discharged.

Fig. 3 is a bottom plan view of the charging bucket.

Referring more in detail to the drawings, an electric furnace of special construction is illustrated at 1. This furnace forms the basis of my co-pending application, Serial No. 151,720, filed March 1, 1917, and is shown comprising a body portion 2 and roof 3. The roof is supported by a suitable crane or other device 4, which is pivoted or otherwise hinged adjacent the side of the body portion 2 to permit of said roof being swung back out of engagement with the top wall of the body portion, substantially as shown in Fig. 1, in order that unobstructed access to the melting chamber of the furnace may be had for purposes of recharging. The body of the furnace is provided with the usual refractory lining 5, outer metallic shell 6, bottom contact 7 and pouring spout 8. The electrode 9 is supported in any suitable manner above the roof 3 and extends therethrough into the melting chamber. It will be noted that the roof is hinged in such manner as to permit of the electrode clearing the upper wall of the furnace, when said roof is tilted back, without any preadjustment of said electrode.

The charging bucket which forms an important feature of the present invention, is illustrated at 10 and is shown suspended from a beam 11, by suitable supports 12, shown in the drawings in the form of chains. The bottom of the bucket is formed preferably of quadrantal sections 13, each of which is hinged to suitable lugs 14, positioned on the outer wall of the bucket. These quadrantal sections form swinging doors adapted to facilitate the discharge of scrap into the furnace. A rod 15 is shown hooked or otherwise detachably fastened to the beam 11 at one end 16 and extends down through the bucket, the lower end of said rod being provided with an enlarged head 17 which engages the lower faces of the swinging doors 13 to support them in their closed position, as shown in Fig. 1.

It is obvious from this construction, that when the beam 11 is lowered with relation to the bucket, the rod 15 will also be lowered, the enlarged head 17 thereof engaging the bottom of the furnace and thereby acting to disengage the upper end 16 of said rod and permitting the same to descend to a position sufficiently low to permit the doors 13 to swing past said head 17 to their open positions, substantially as illustrated in Fig. 2 when the bucket is raised. In this position the rod 15 is supported by means of the chain 18 which acts to raise the rod when the bucket is raised and to support the same in readiness to again lock the doors in their closed positions when it is desired to refill said bucket. It is obvious, in the event the lowering of the head 17 into contact with the furnace bottom does not immediately disengage the hook 16 from the beam 11 thereby permitting the rod 15 to descend as above described, that the operator or person in charge may readily and quickly effect its disengagement either by hand or otherwise.

By referring to Fig. 1 of the drawings, it will be noted that the hinges 19 of the doors 13 and the lugs 14 to which said doors are hinged coöperate to form feet for the bucket, which are adapted to rest on the sides of the melting chamber when said doors are closed and to support said bucket in its upright position, while the beam 11 and rod 15 are being lowered.

From the foregoing, it will be observed that in order to recharge the furnace after the steel has been poured off, it is merely necessary to swing back the roof 3, as shown in Fig. 1, then lower the bucket 10 containing the charge, directly into the melting chamber until it is supported on the feet or lugs 14. The beam 11 is then lowered relative to said bucket until the rod 15 carried thereby is disengaged therefrom by coming into contact with the furnace bottom at which time the beam is raised slightly by means of a hoist or other suitable mechanism, (not shown) leaving the rod suspended therefrom by means of the chain 18 and the doors 13 swinging open, as above set out. Further raising of the beam after the doors have swung open acts to "skin off" the bucket from the charge leaving the same in position to be operated on within the melting chamber. The roof is then swung back into position and the steel making process again started.

It is well known that the lining of a steel furnace is soft under working temperature. Accordingly the throwing of a heavy charge of scrap weighing several tons into the furnace would injure the lining and start erosion, which in time would require expensive patching. This is obviated however, in the present invention, by the use of the charging bucket which places the load on the bottom instead of dropping it thereon.

In practice it has been found that the present method of charging effects an approximate saving in time of 80% over the methods now in common use. Hence it will be readily observed that heat loss is greatly reduced and that the output of the furnace is greatly increased.

It is obvious that various changes and modifications may be made in the structure herein illustrated and described, and the right is therefore reserved to make such changes and modifications as fall within the scope of the appended claims.

Having thus described my invention, what I claim as new and desire to secure by Letters Patent of the United States is:

1. A charging apparatus for electric furnaces comprising a support, a bucket suspended therefrom, a plurality of swinging doors at the bottom of said bucket, means detachably secured to said support and adapted to detachably engage said doors to hold them in closed position, and means whereby the lowering of said support with relation to said bucket causes said doors to be released.

2. A charging apparatus for electric furnaces comprising a bucket, a drop bottom therefor, and means extending through said bucket and terminating below said bottom to support the same in closed position, the lowering of said means acting to release said bottom.

3. The combination with a cup-shaped receptacle, of a charging apparatus comprising a bucket adapted to be lowered into said receptacle and to be supported on the sides thereof, a drop bottom for said bucket, means engaging the under face of said bottom to support the same in closed position and out of contact with the bottom of said receptacle, and means for lowering said bottom supporting means to permit the contents of said bucket to discharge into said receptacle.

4. A charging apparatus for electric furnaces comprising a cross beam, a bucket suspended therefrom, lugs mounted on the lower end of said bucket adapted to form feet to support said bucket on the sides of the melting chamber of said furnace, a plurality of swinging doors hinged to said lugs, and a single rod for supporting said doors in closed position, said rod being attached to said beam, whereby the lowering of said beam relative to said bucket releases said doors.

5. A charging apparatus comprising a beam, a bucket suspended therefrom, a drop bottom for said bucket, means secured to said beam and adapted to support said bottom in closed position by engagement with the under face thereof, and means whereby the lowering of said beam relative to said bucket releases said bottom.

6. Charging apparatus comprising a support, a bucket, means suspending said bucket from said support, a drop bottom for said bucket, and a rod having a hook engaging said support and having means engaging said drop bottom to hold said bottom in closed position, whereby said support may move toward said bucket when the latter is supported on its base thereby releasing said rod from said support and releasing said drop bottom.

7. Charging apparatus comprising a support, a bucket, means suspending said bucket from said support, a drop bottom for said bucket, and a rod depending from said support and having means for detachably engaging said drop bottom to hold the same in closed position, whereby the lowering of said support relative to said bucket acts to release said bottom.

8. The combination with a cup-shaped receptacle, of a charging device therefor, a drop bottom for said charging device, and a rod having means for engaging the under face of said bottom to hold the same in closed position, said charging device being adapted to be lowered into said receptacle and to be supported on the sides thereof with said drop bottom disposed above the bottom of said receptacle, whereby said rod may be lowered to release said bottom.

9. The combination with a cup-shaped receptacle, of a charging apparatus therefor comprising a bucket, a support, and means suspending said bucket from said support, a drop bottom for said bucket, and a rod detachably connected to said support and having means for detachably engaging said bottom to support the same in closed position, said bucket being adapted to be lowered into said receptacle and to be supported on the sides thereof with said bottom disposed above the bottom of said receptacle, the lowering of said support after said bucket has been placed within said receptacle acting to disengage said drop bottom supporting means from said bottom and to effect an engagement thereof with the bottom of said receptacle to thereby disconnect said rod from said support, whereby the bottom of said bucket will drop to open position when said bucket is raised.

In witness whereof, I hereunto subscribe my name this 21st day of June, A. D., 1917.

FREDERICK T. SNYDER.